United States Patent

Miller

(10) Patent No.: US 9,465,664 B1
(45) Date of Patent: Oct. 11, 2016

(54) SYSTEMS AND METHODS FOR ALLOCATION OF ENVIRONMENTALLY REGULATED SLACK

(71) Applicant: Honeywell International Inc., Morristown, NJ (US)

(72) Inventor: Larry James Miller, Black Canyon City, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/848,381

(22) Filed: Sep. 9, 2015

(51) Int. Cl.
*G06F 9/46* (2006.01)
*G06F 9/50* (2006.01)

(52) U.S. Cl.
CPC .................. *G06F 9/5038* (2013.01)

(58) Field of Classification Search
CPC ................................ G06F 9/4881
USPC ......................... 718/102, 103, 107
See application file for complete search history.

(56) References Cited

U.S. PATENT DOCUMENTS

| | | | |
|---|---|---|---|
| 6,442,700 B1 | 8/2002 | Cooper | |
| 6,823,516 B1 | 11/2004 | Cooper | |
| 7,137,117 B2 | 11/2006 | Ginsberg | |
| 7,140,022 B2 | 11/2006 | Binns | |
| 7,302,685 B2 | 11/2007 | Binns | |
| 7,386,853 B2 | 6/2008 | Hanzawa | |
| 8,069,290 B2 | 11/2011 | Conti et al. | |
| 8,347,012 B2 | 1/2013 | Goss et al. | |
| 8,661,446 B2 | 2/2014 | Conrad et al. | |
| 8,695,004 B2 * | 4/2014 | Kaiser | 718/103 |
| 8,775,838 B2 | 7/2014 | Lee et al. | |
| 8,813,080 B2 | 8/2014 | Fenger et al. | |
| 2002/0120661 A1 | 8/2002 | Binns et al. | |
| 2002/0120663 A1 | 8/2002 | Binns | |
| 2007/0226795 A1 | 9/2007 | Conti et al. | |
| 2008/0098245 A1 | 4/2008 | Hogan et al. | |
| 2012/0233488 A1 | 9/2012 | Burchard et al. | |
| 2013/0111247 A1 | 5/2013 | Hildner | |
| 2014/0115368 A1 | 4/2014 | Muralidhar et al. | |
| 2014/0281088 A1 * | 9/2014 | VanderLeest | G06F 13/26 710/264 |
| 2015/0121396 A1 * | 4/2015 | Martinez Canedo | G06F 8/4452 718/105 |

OTHER PUBLICATIONS

Cunningham, "A BSP Porting Library for Embedded Peripherals", Jul. 1, 2000, pp. 1-5, Publisher: Dr. Dobb's The World of Software Development, Published in: US.
Lin et al., "A Type of Real-Time Systems Designing Which Applied in Aeroships", "Computer Measurement & Control", Apr. 2012, pp. 1026-1028, 1032, vol. 20, No. 4, Publisher: Magazine Agency of Computer Measurement & Control, Published in: CN.
Miller, "Porting an RTOS to a New Hardware Platform", Feb. 1, 2006, pp. 1-6, Publisher: Dr. Dobb's The World of Software Development, Published in: US.

* cited by examiner

*Primary Examiner* — Andy Ho
(74) *Attorney, Agent, or Firm* — Fogg & Powers LLC

(57) ABSTRACT

Systems and methods for allocation of environmentally regulated slack are provided. In one embodiment, a time-partitioned processing system comprises: at least one processing core; a memory coupled to the processing core; a real-time operating system including a scheduler configured to partition processing time for the processing core into a plurality of time periods, wherein the scheduler further budgets a pre-determined duration of processing time for executing a first budgeted time partitioned entity (TPE) by allocating at least a first allocation of time to the first budgeted TPE; wherein the scheduler utilizes at least a portion of processing time not used to execute the first budgeted TPE or any other budgeted TPE as environmentally regulated slack; wherein the scheduler allocates at least a portion of environmentally regulated slack to one or more slack consuming TPEs based on a measurement of one or more operational environment parameters associated with the processing core.

19 Claims, 6 Drawing Sheets

SYSTEMS AND METHODS FOR ALLOCATION OF ENVIRONMENTALLY REGULATED SLACK

BACKGROUND

Time partitioned processing systems are typically used for safety critical real time applications where critical tasks need to be guaranteed time to execute. The granularity at which time partitioning is applied differs among scheduling paradigms, where in some paradigms a number of tasks share a common time budget, and in other paradigms each task has an independent budget. For this disclosure, we will refer to such task(s) as a time partitioned entity or "TPE". A TPE can be, for example, a 653 Partition which encompasses multiple tasks, or it can be a time partitioned RMA thread. Accordingly, such TPEs are allocated time periods with guaranteed processing time budgets in which they are executed. The budget for each TPE is established under worst case cache conditions and account for worst case code paths to ensure that they provide sufficient processing time for the TPE to complete the budgeted task with still some additional margin padding. However, TPEs often complete their budgeted task with time to spare within their allocated partition leaving slack time available. In fact, depending upon the hosted applications, sometimes large amounts of slack time remain in a partition after execution of the budgeted TPE is completed. In multi-core systems, budget padding can be extreme because execution time variation of TPEs tend to increase and worst case cross-core interference is assumed for memory interactions, real-time operating system critical sections assume worst case timing interactions between cores, etc. With these worst case estimates built into the budgets for executing budgeted TPEs, experience has shown that slack time available in a partition can sometimes exceed the amount of time that is both budgeted and used in a time-partitioned system. For this reason, many real time safety critical operating systems have a means to reallocate the slack processing time which results from budget under-utilization, giving it to other TPEs which may have used their entire fixed budget and yet still desire more CPU time. It should be noted that design-related factors can contribute greatly to slack production. A TPE may have a repetitive work-load pattern which varies, causing it to use most of its budget in one frame but much less in another. Other TPEs may be highly modal, generating large amounts of slack for long periods of time while waiting on some external stimuli.

One problem that arises, however, with reallocating available slack to TPEs desiring use of this time is that total processor utilization can be pushed towards the capacity limits of the processor. Whereas a processor's thermal and power usage of a time partitioned system hosting a set of applications may be highly predictable or at least boundable based on regular usage patterns of trusted, high assurance software, when slack is allowed, thermal and power predictability can be compromised. A single low criticality slack consumer could drive CPU utilization to 100% indefinitely by consuming all available slack, perhaps even due to an application error. This scenario forces the system designer to either provide a worst-case thermal and power solution or forgo the benefits of slack scheduling. In addition to the processor simply running hotter and utilizing more power, thermal margins between the processor operating temperature and the local ambient environment, and/or the heat dissipating capacity of the processing system, are reduced. This reduces the thermal margin available to continue operation during an event that may quickly increase the temperature of the operating environment. In fact, if the thermal solution is not sized to accommodate continuous 100% CPU utilization during high ambient conditions, unbounded slack utilization can lead to a thermal overload of the processor so that the scheduling of non-critical tasks during slack time may compromise the ability of the system to execute the safety critical TPEs.

For the reasons stated above and for other reasons stated below which will become apparent to those skilled in the art upon reading and understanding the specification, there is a need in the art for systems and methods for allocation of environmentally regulated slack.

SUMMARY

The Embodiments of the present invention provide methods and systems for allocation of environmentally regulated slack and will be understood by reading and studying the following specification.

In one embodiment, a time partitioned processing system comprises: at least one processing core; a memory coupled to the at least one processing core; a real-time operating system, the real-time operating system including a scheduler configured to partition processing time for the at least one processing core into a plurality of time periods, wherein the scheduler further budgets a pre-determined duration of processing time for executing a first budgeted time partitioned entity (TPE) by allocating at least a first allocation of time to the first budgeted TPE; wherein the scheduler utilizes at least a portion of processing time within the plurality of time periods not used to execute the first budgeted TPE or any other budgeted TPE as environmentally regulated slack; wherein the scheduler allocates at least a portion of environmentally regulated slack to one or more slack consuming TPEs based on a measurement of one or more operational environment parameters associated with the at least one processing core.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods that introduce an environment monitor which is utilized by a time-partitioned processing system to evaluate when (and/or how much) slack time may be allocated to time partitioned entities desiring such allocations. By utilizing the environment monitor, the system's task scheduler can take advantage of the large amount of slack time that is generated by time partitioned systems and provide a slack shaping capability that is regulated based on environmental constraints such as thermal and/or power constraints. As such, the embodiments described herein provide protection against a slack consumer detrimentally driving thermal characteristics and margins of the system. In some embodiments, a mild processor sleep state may also be mandated during those slack times when no useful work can be scheduled due to environmental throttling of slack time use. It should be understood that the term "time partitioned entity" or "TPE" as used herein is intended to refer to any segment of executable computer instructions (that is, a segment of a program) such as, but not necessarily limited to, threads in a time-partitioned RMA, a multithread application, an ARINC 653 partition, tasks executed in some other time window where multiple tasks share the time quota, and may refer to a single task or a group of tasks sharing a common budget. Similarly, the term "partitioned" may include space and time partitioning in Safety-critical avionics Real-time operating systems as defined by Avionics Application Standard Software Interface ARINC (653), but is not so limited. They may refer to any pre-determined duration of time periods budgeted on a processor for the execution of TPEs.

Figure 1:
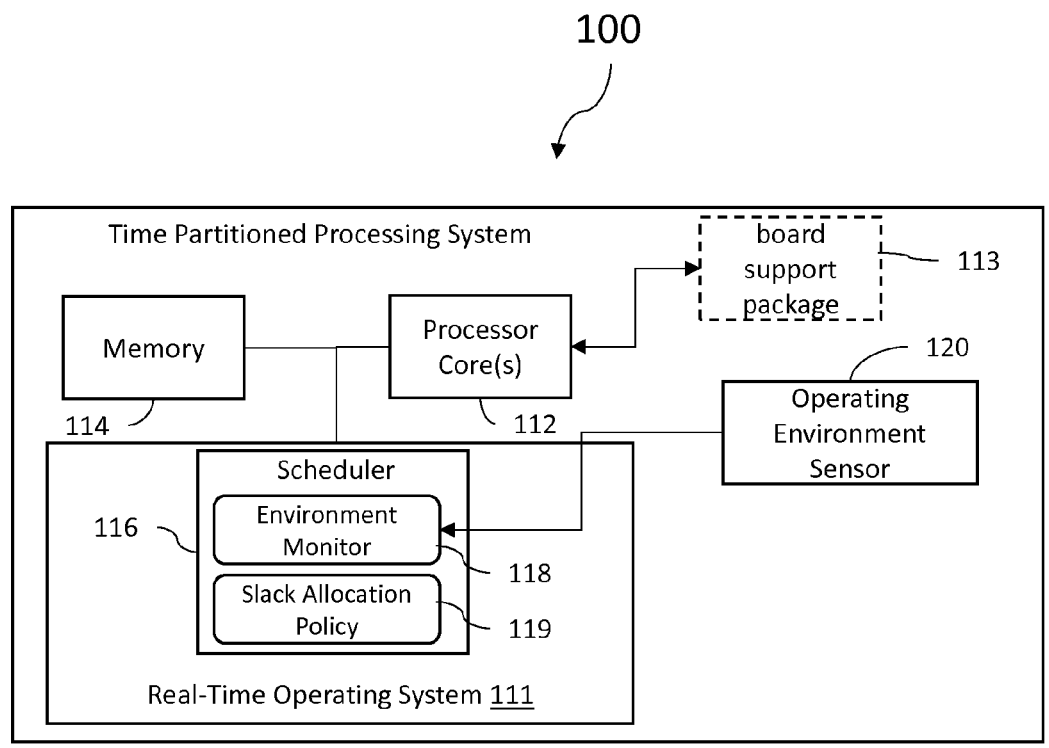
FIG. 1 is a diagram illustrating a time partitioned operating system of one embodiment of the present disclosure.

FIG. 1 is a diagram illustrating at 100 a time partitioned processing system of one embodiment of the present disclosure. System 100 includes one or more processing cores 112 coupled to a memory 114 and a real-time operating system (RTOS) 111. System 100 is a time partitioned processing system in that RTOS 111 partitions access to the one or more processing cores 112 so that high priority tasks, referred to herein as budgeted TPEs, are executed in time periods having a pre-determined duration of time budgeted to execution of these TPEs. In some embodiments, all of the one or more processing cores 112 while in others only a subset of the total number of cores is time partitioned. In other embodiment, some portion of the processing timeline for one or more of the cores 112 may be time partitioned while another segment of the timeline is not. The time budget provides sufficient time to complete their budgeted tasks without interference or corruption from the execution of other tasks. Scheduling of the execution of TPEs (for both TPEs executing on fixed budget and those executing on slack) on the one or more processing cores 112 is performed by the scheduler 116, which may be a component of the RTOS 111. With embodiments of the present disclosure, scheduler 116 allocates slack time to TPEs desiring slack time processing resources based on other operational considerations. That is, scheduler 116, in addition to considering what slack time is available and what TPEs are requesting access to that slack time, also considers environmental parameters (such as the operating temperature of the one or more processing cores 112, or other element of system 100, or ambient temperature) and/or operational parameters (such as power constraints). To that end, in the embodiment shown in FIG. 1 scheduler 116 either comprises or otherwise interfaces with an operational environment monitor 118 that is coupled to at least one processor operating environment sensor 120 and a slack allocation policy 119. It should be appreciated that in alternate embodiments, the environment monitor 118 and the slack allocation policy 119 may be part of the real-time-operating system 111, or one or both may be alternately implemented as a board support package. The operating environment sensor 120 may comprise a sensing device such as a voltage, current, power or temperature sensor, or a combination thereof, and may be integral to the processor core(s) 112 or implemented using separate hardware components. Environment monitor 118 receives and processes the data from sensor 120. In one embodiment, environment monitor 118, based on the data from sensor 120, compares the sensor data to various pre-determined categories of possible operating conditions and from that determines a current operating environment state which may be communicated to the scheduler 116. For example, if the data from sensor 120 indicates temperature and power draw within a predefined normal operating range, then environment monitor 118, then environment monitor 118 may indicate the current operating environment state as "Normal". If instead, the data from sensor 120 indicates that the CPU temperature exceeds a predefined operational threshold and is operating in a moderately elevated temperature range, then environment monitor 118 may indicate the current operating environment state as exceeding the moderate temperature threshold. A plurality of different possible operating state categories may be established for different thresholds and ranges of the parameters measured by sensor 120. Slack-time allocation policy 119 sets forth criteria or rules applied by scheduler 116 indicating which, if any, and/or when slack consuming TPEs may be executed depending on the current operating conditions as defined by environment monitor 118.

In one embodiment, power limits can be assessed by environment monitor 118 based on power draw, current draw, or by voltage levels or voltage fluctuations, or some combination thereof. Power related thresholds may be assessed instantaneously or averaged over some period of time. Likewise, temperature values can be assessed as a unit temperature, board temperature, or temperature as measured from a processor core or package sensor. In one embodiment, these temperatures can be assessed for the purposes of monitoring by taking periodic instantaneous values, or averaging temperature readings over some period of time, or even by taking several temperature readings into account. Detection can be accomplished by software, hardware, or through some combination of hardware and software. In alternate implementations, power and/or temperature thresholds can be enforced with or without hysteresis.

Figure 2:
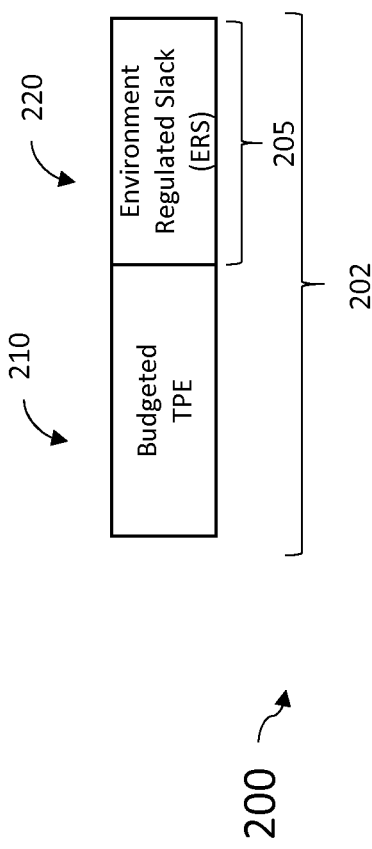
FIG. 2 is a diagram illustrating a periodically reoccurring partition of one embodiment of the present disclosure comprising environmentally regulated slack.

FIG. 2 is a diagram illustrating at 200 an example of a periodically arbitrary time period 202 scheduled by scheduler 116 for system 100. In some embodiments, time period 202 may be a reoccurring time period of a larger frame such as a reoccurring time slot. However, this is not necessarily the case and may just be some duration of time budgeted for execution of a TPE which was allocated on some other basis. In FIG. 2, a budgeted TPE 210 is scheduled to execute during time period 202 and is guaranteed by scheduler 116 the full time of time period 202 to complete its task. If budgeted TPE 210 completes its task prior to the completion of time period 202, the remaining balance of time in time period 202 (shown at 205) comprises environmentally regulated slack (ERS) 220. ERS 220 comprises slack time that may be allocated to a slack consuming TPE to take up all or part of the remaining time in time period 202. Whether or not ERS 220 is allocated to execute a slack consuming TPE is determined by scheduler 116 based on applying slack-time allocation policy 119 to the current operating state defined by environment monitor 118.

Figure 2A:
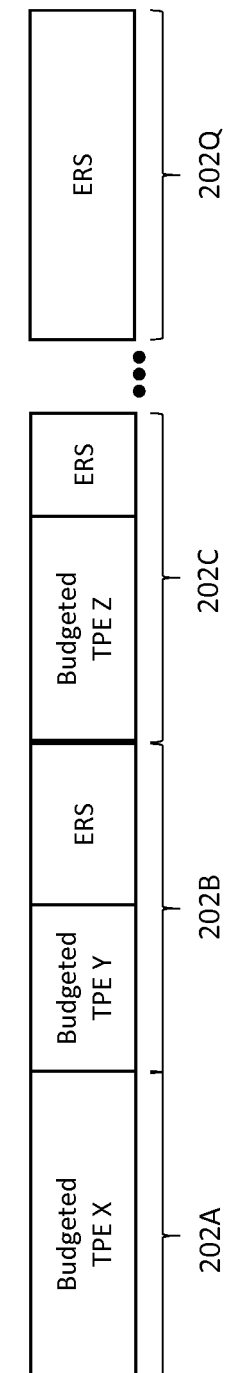
FIG. 2A is a diagram illustrating a sequence of periodically reoccurring time periods of one embodiment of the present disclosure comprising environmentally regulated slack.

FIG. 2A at 250 illustrates another sequence of separate time periods (shown at 202A, 202B, 202C, . . . 202Q) which may be scheduled by scheduler 116 for executing budgeted TPE, slack consuming TPE, or some combination thereof. In some embodiments, each of the time periods shown in FIG. 2A may be equal in duration, but that is not necessarily so in other embodiments. As shown at 252, in the first time period 202A in the sequence, a budgeted TPE "X" is executed which consumes the entirety of that time period leaving no slack time for scheduler 116 to allocate. It should be noted that while TPE "X" is provided sufficient budgeted time to perform its critical tasks, it may also desire additional time to execute auxiliary tasks and request slack time from scheduler 116 for that purpose. As such, a TPE which is categorized as a "budgeted TPE" during its own budgeted time periods may be categorized as a slack-consuming TPE if executed during slack-time of other time periods that are budgeted to other budgeted TPEs, or time period set aside for slack-consuming TPEs. In some cases, other TPEs may be pure slack consuming, and only executed during available slack time. Such pure slack consuming are low priority tasks that are never guaranteed any execution time. Time periods 202B and 202C execute the respective budgeted TPEs Y and Z. The balance of processing time available for environmentally regulated slack in each of these time periods will depend on the how much of the time period was consumed by the respective budgeted TPEs Y and Z. As illustrated by the example of time period 202Q, some time periods may optionally be dedicated entirely as environmentally regulated slack for executing slack consuming TPEs and not budgeted to a critical TPE. Thus, while no specific slack consuming TPE is guaranteed execution time, the provisioning of time period 202Q provides that for each cycle of partitions, at least some slack-time will be available if the current operating environment state permits. Also, one or more time periods may be reserved for conditionally scheduled TPEs. Such time periods present a reserved duration of time in the timeline that will be used for a specific ERS consuming TPE and otherwise becomes restricted slack.

Figure 2B:
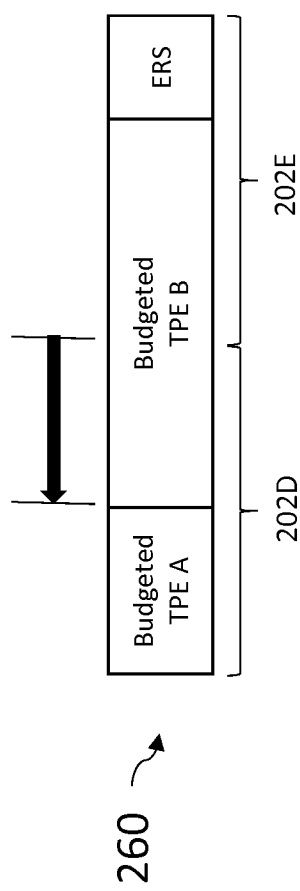
FIG. 2B is a diagram illustrating another sequence of periodically reoccurring time periods of one embodiment of the present disclosure comprising environmentally regulated slack.

In another embodiment, such as shown at 260 in FIG. 2B, if a budget TPE (TPE A for example) fails to use all of its budgeted time period 202, it will complete early and the next TPE (TPE B for example) is allowed to shift in time to start early. In that case, rather than having a number of smaller slack-time opportunities produced in the timeline, each successive time period for executing a budgeted TPE has an opportunity (if so configured) to start early. If budget TPE B is also configured to be a slack consumer, it may potentially exceed its scheduled duration (i.e., the duration of its original time period 202E) and use up slack accumulated from earlier time periods in the timeline, though it cannot extend its execution time to go beyond its originally configured end time of time period 202E. Similarly, a "clean-up" time period which may be schedule at the end of a timeline which inherits all of the slack time accumulated up until then. Time period 202Q in FIG. 2A, may be implemented for such a purpose. In still another embodiment, a time partitioned RMA may have no dedicated time slots at all. Rather a collection of TPEs from different time periods exist where the sum total of TPE budgets must tally to less than or equal to 100% of the capacity of the processing core(s) 112. In this case, TPEs that use less than their budgeted time allotment donate to a slack pool. Later TPEs can use that time if so configured as slack consumers. Unbudgeted CPU time is of course included in the slack pool by default.

In operation, during conditions where the current operating environment state becomes more severe and the margin for using slack time becomes more constrained, slack-time allocation policy 119 can be tailored to provide flexibility in how slack time is throttled or curtailed. Scheduling of slack consuming TPEs may be controlled in a manner where non-essential task activity is gradually scaled back and even completely disallowed as temperature or power usage increases. The specific threshold values set forth in slack-time allocation policy 119 may be implementation dependent. Curtailment of environmentally regulated slack can be accomplished via a timeline percentage, a priority value, or numeric indication which the scheduler 116 interprets, or via a frame map where the scheduler 116 is told to allow non-essential scheduling in certain frames only, or through commands to disable/disallow specific applications or scheduling capabilities (such as processor slack). For example, in one implementation, based on a hierarchy of increasingly severe operating environment states, allocation of the environmentally regulated slack can be increasingly curtailed.

Environmentally regulated slack which, due to the application of slack-time allocation policy 119, is off-limits for executing slack consuming TPEs, is referred to herein as restricted slack time. In some implementations, when environmentally regulated slack is designated as restricted slack time, no TPE is allowed to execute during restricted slack time period, allowing the processor 112 to rest. In some embodiments, during restricted slack times, processor 112 may be placed into a sleep state further reducing processor power consumption and heat production. For example, in one embodiment, an optional board support package (shown in FIG. 1 at 113 coupled to processor 112) may be invoked during a time period when all environmentally regulated slack is curtailed or otherwise remains unallocated. This provides an opportunity to put processor 112 to sleep, usually until the next interrupt or periodic partition scheduling point occurs. In other implementations during restricted slack time, environmentally regulated slack is restricted to allocation to only a limited predefined subset of slack consuming TPEs.

Figure 3A:
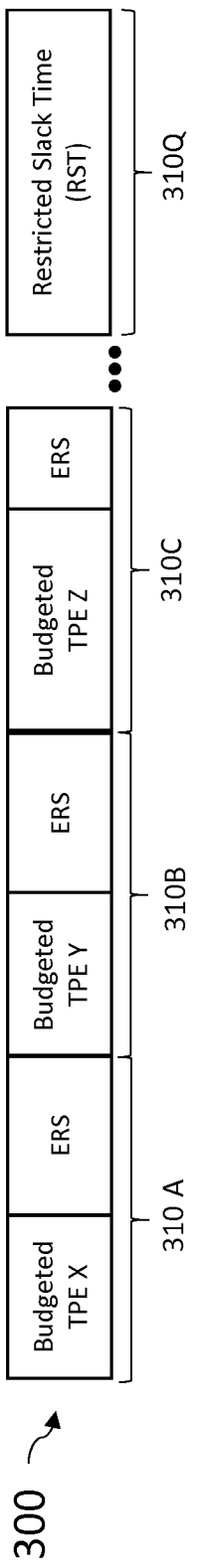
FIGS. 3A and 3B are diagrams illustrating environmentally a sequence of periodically reoccurring time periods of one embodiment of the present disclosure where environmentally regulated slack is designated as restricted slack time.
Figure 3B:
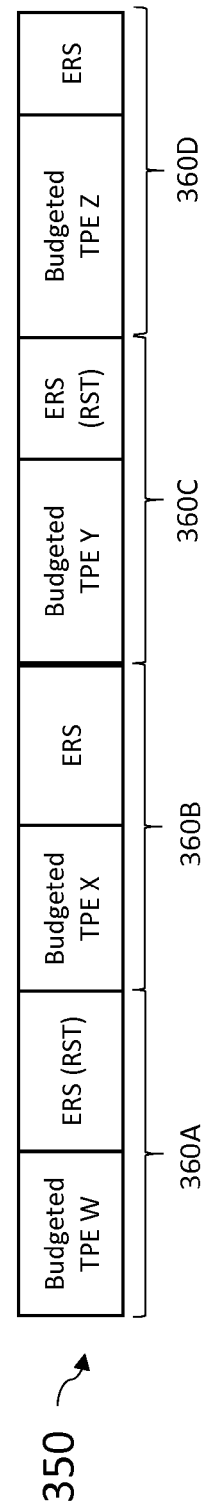

FIG. 3A at 300 shows one example implementation where because of the current operating environment state, time period 310Q is designated by scheduler 116 to be entirely restricted slack time due to the current operating environment state. In this example, scheduler 116 does not allocate any of time period 310Q for executing TPEs so that processor 112 is certain to be provided at least the duration of time period 310Q as a rest period during this cycle of partitions. FIG. 3B at 350 shows another example implementation where slack consuming TPEs are permitted to be allocated in some partitions, but not in others. For example, environmental regulated slack is available in time periods 360A (after budgeted TPE W is completed) and in 360C (after budgeted TPE Y is completed), but these unused balances of remaining time in time periods 360A and 360C are designated as restricted slack time. Meanwhile, environmental regulated slack is also available in time periods 360B (after budgeted TPE X is completed) and 360 D (after budgeted TPE Z is completed) where it is not designated as restricted slack time but instead available for scheduler 116 to allocate to a slack consuming TPE. Using this scheme, the percentage of environmental regulated slack available to scheduler 116 for allocation can be at least roughly controlled by regulating the percentage of timeslots designated as having restricted slack time. In other embodiments, scheduler 116 may be permitted to allocate any available environmental regulated slack during time periods for a complete cycle (i.e. a frame) of partitions, while restricted during the next. It should be noted that regardless of the particular scheme used to compile slack time for use to execute slack consuming TPEs, with the embodiments of the present disclosure, when and how that slack time may utilized is further regulated based on the operating environment state of system 100.

Figure 4:
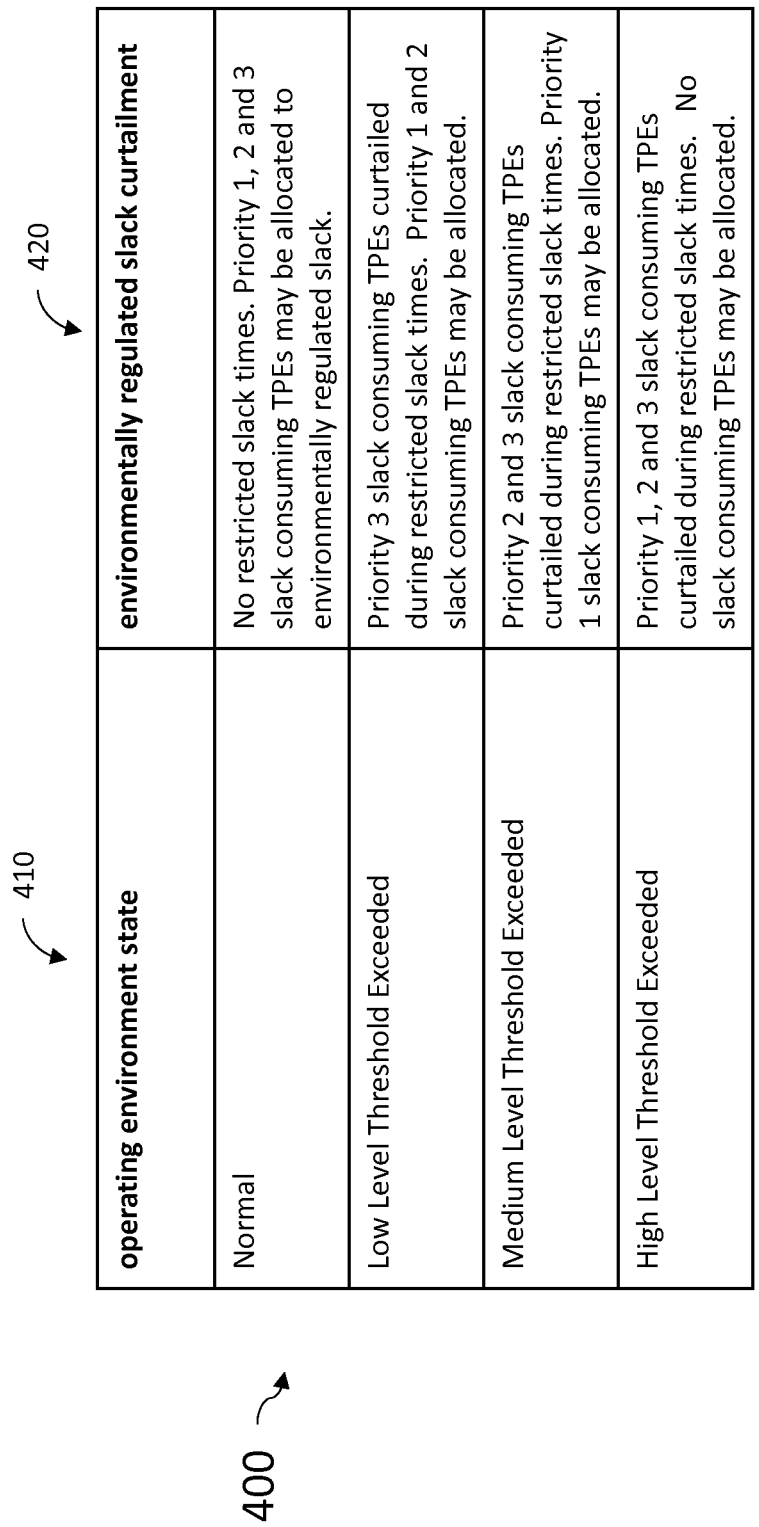
FIG. 4 is a table illustrating priority based curtailment of environmentally regulated slack allocation to slack consuming TPEs of one embodiment of the present disclosure.

In still other embodiments, slack consuming TPEs may be assigned a priority value used to further regulate when they may be executed based on the operating environment state of system 100. During a normal operating environment state, all slack consuming TPEs are eligible for scheduling. For example, in one such implementation, when the operating environment state becomes more severe, relatively lower priority TPEs become curtailed so that only higher priority slack consuming TPEs are eligible for scheduling during environmentally regulated slack time. One example of a slack allocation policy 119 that implements priority based scheduling of environmental regulated slack is provided in the example policy 400 of FIG. 4. As shown in the first column at 410, the operating environment state assigned by the environment monitor 118 may be one of several states based on the operating environment data received from the operational environment sensor 120. In this particular example, four states: Normal, Low Level Threshold Exceeded, Medium Level Threshold Exceeded, and High Level Threshold Exceeded, are defined by the environment monitor 118. In other implementations, the number of possible operating environment state may be fewer or greater than four. Column 420 shows the priority based rule to be implemented to curtail allocation of environmentally regulated slack as a function of the operating environment state indicated in column 410. In this example, each TPE in the population of potential slack consuming TPEs are categorized and assigned a priority. In this example, potential slack consuming TPEs are categorized as either priority 1, 2 or 3, with priority 1 TPEs the highest priority and priority 3 TPEs the lowest. In other implementations, the number of possible priority levels assigned to the potential slack consuming TPEs may be fewer or greater than three. When the operating environment state as determined by the environment monitor 118 is normal (indicating, for example, that no temperature and/or power related thresholds are exceeded), then no environmentally regulated slack is designated as a restricted slack times and scheduler 116 is free to schedule slack consuming TPEs without the need to mitigate operational environment concerns. When one or more designated low level thresholds are exceeded, then priority 3 slack consuming TPEs will not be allowed to utilize slack during restricted slack times, while priority 1 and 2 TPEs may continue to be scheduled to utilize slack by scheduler 116. When one or more designated medium level thresholds are exceeded, then priority 2 and priority 3 slack consuming TPEs will not be allowed to utilize slack during restricted slack times. Only priority 1 TPEs may continue to be scheduled by scheduler 116 during restricted slack times. When one or more designated high level thresholds are exceeded, then priority 1, 2 and priority 3 slack consuming TPEs will not be allowed to utilize slack during restricted slack times. Note that in some implementations, a priority based slack allocation policy may be combined with partition based allocation curtailment such as discussed above with respect to FIGS. 3A and/or 3B. That is, in such an implementation, the priority based slack allocation policy would only apply to time periods with environmentally regulated slack designated as restricted slack time and not to time periods with environmentally regulated slack not designated as restricted slack time.

Figure 5:
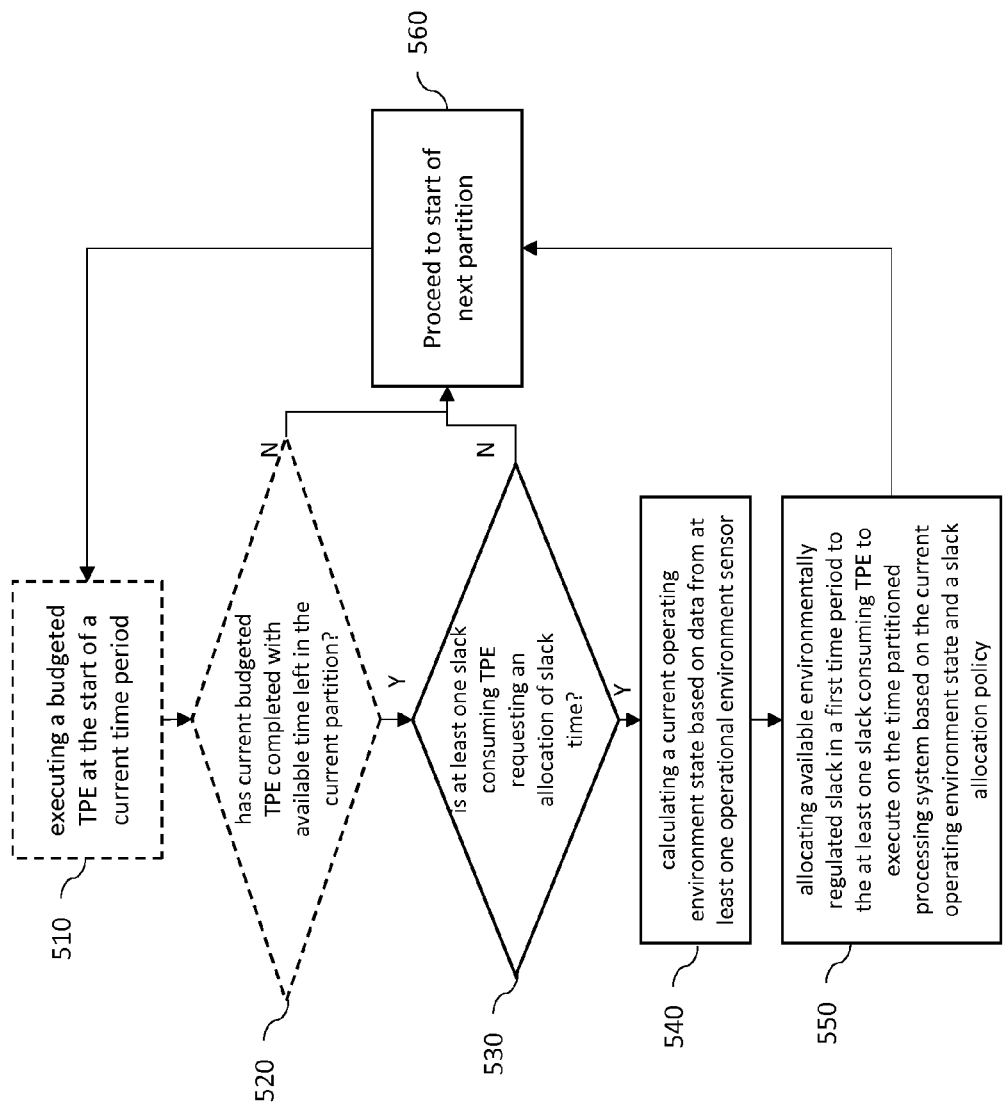
FIG. 5 is a flow chart illustrating a method of one embodiment of the present disclosure.

FIG. 5 is a flow chart diagram illustrating a method 500 of one embodiment of the present disclosure. It should be understood that method 500 may be implemented using any one of the embodiments described above. As such, elements of method 500 may be used in conjunction with, in combination with, or substituted for elements of the embodiments described above. Further, the functions, structures and other description of elements for such embodiments described above may apply to like named elements of method 500 and vice versa. In one embodiment the method begins at 510 with executing a budgeted TPE at the start of a current time period and proceeds to 520 which comprises determining when the budgeted TPE has completed execution with available time left in the current partition. As previously illustrated in FIG. 2, a budgeted TPE that is scheduled to execute during a time period is guaranteed by the system scheduler the full time of the time period to complete its task. When the budgeted TPE completes its task prior to using all its available time, the remaining balance of time in that time period comprises environmentally regulated slack (ERS) which is now free for re-allocation. With embodiments of the present disclosure, whether that environmentally regulated slack is allocated to execute a slack consuming TPE is determined based on measurements of one or more operational environment parameters (for example, temperature and/or power measurements) associated with the systems processing core or cores. This determination may be made based on applying rules defined in a slack-time allocation policy as dictated by a current operating state. While the method may begin at 510 and proceed to 520, in some implementations the method may instead begin at 530, such as would be the case for a time period such as time period 202Q discussed above during which no budgeted TPE is executed.

At 530 the method proceeds with determining when at least one slack consuming TPE is requesting an allocation of slack time to execute on a time partitioned processing system. If not, then there is no need to make an allocation. If so, then the method proceeds to 540 with calculating a current operating environment state based on data from at least one operational environment sensor. As discussed above, allocation of environmentally regulated slack may be permitted without restrictions when the current operating environment state is normal, but throttled or curtailed when the current operating environment state indicates that one or more operating thresholds have been exceeded. Curtailment of these allocations under such environments permits the processor(s) to continue to operate and execute critical budgeted TPEs while maintaining sufficient margins to avoid damage or degradation. The method accordingly proceeds to 550 with allocating available environmentally regulated slack in a first time period to the at least one slack consuming TPE to execute on the time partitioned processing system based on the current operating environment state and a slack allocation policy, wherein the slack allocation policy defines criteria for allocating the environmentally regulated slack based on the current operating environment state. As discussed above, when allocations to slack consuming TPEs are to be curtailed, the slack allocation policy may implement policies to do so based on throttling the time which may be allocated to slack consuming TPEs, based on a priority assigned to each of the slack consuming TPEs, or some combination thereof. Once the duration of the current time period is completed, the method may be performed again for the next time period (as shown at 560).

EXAMPLE EMBODIMENTS

A time partitioned processing system, the system comprising: at least one processing core; a memory coupled to the at least one processing core; a real-time operating system, the real-time operating system including a scheduler configured to partition processing time for the at least one processing core into a plurality of time periods, wherein the scheduler further budgets a pre-determined duration of processing time for executing a first budgeted time partitioned entity (TPE) by allocating at least a first allocation of time to the first budgeted TPE; wherein the scheduler utilizes at least a portion of processing time within the plurality of time periods not used to execute the first budgeted TPE or any other budgeted TPE as environmentally regulated slack; wherein the scheduler allocates at least a portion of environmentally regulated slack to one or more slack consuming TPEs based on a measurement of one or more operational environment parameters associated with the at least one processing core.

Example 2 includes the system of example 1, wherein any balance of time in a first time period remaining after execution of the first budgeted TPE is complete is utilized by the scheduler as environmentally regulated slack.

Example 3 includes the system of any of examples 1-2, wherein at least one time period of the plurality of time periods is not utilized to schedule budgeted TPEs and is utilized as environmentally regulated slack.

Example 4 includes the system of any of examples 1-3, further comprising: an environment monitor in communication with the scheduler; at least one operational environment sensor coupled to the environment monitor, wherein the at least one operational environment sensor measures at least one of the one or more operational environment parameters associated with the at least one processing core and the environment monitor determines an operational environment state based on the one or more operational environment parameters; and a slack allocation policy accessible to the scheduler, the slack allocation policy defining rules for the allocating environmentally regulated slack; wherein the scheduler allocates environmentally regulated slack to the one or more slack consuming TPEs based on the operational environment state determined by the environment monitor and the slack allocation policy.

Example 5 includes the system of example 4, wherein when the operational environment state indicates that an operational environment threshold is exceeded, the scheduler designates the portion of the environmentally regulated slack as restricted slack time during which allocation of said portion of the environmentally regulated slack to slack consuming TPEs is at least partially curtailed.

Example 6 includes the system of any of examples 4-5, wherein when the scheduler curtails allocation of environmentally regulated slack to slack consuming TPEs based on priority.

Example 7 includes the system of any of examples 4-6, wherein when the scheduler curtails allocation of environmentally regulated slack to slack consuming TPEs by reducing the percent of environmentally regulated slack which is eligible for allocation.

Example 8 includes the system of any of examples 4-7, wherein based on the operational environment state determined by the environment monitor and the slack allocation policy, the at least one processing core is placed into a sleep state during periods of environmentally regulated slack not allocated to at least one slack consuming TPE.

Example 9 includes the system of example 8, further comprising a board support package coupled to the at least one processing core, wherein the hoard support package places the at least one processing core into the sleep state until either an interrupt or a periodic partition scheduling point occurs.

Example 10 includes the system of any of examples 1-9, wherein the one or more operational environment parameters associated with the at least one processing core include at least one of: a temperature measurement; a measurement of power or current drawn by the at least one processing core; a measurement of voltage level; a measurement of current, power or voltage fluctuation; or a measurement of an output of a power supply to the at least one processing core.

Example 11 includes a method for environmental regulation of slack allocation for a time partitioned processing system, the method comprising: determining when at least one slack consuming time partitioned entity (TPE) is requesting an allocation of slack time to execute on a time partitioned processing system; calculating a current operating environment state based on data from at least one operational environment sensor; and allocating available environmentally regulated slack in a first time period to the at least one slack consuming TPE to execute on the time partitioned processing system based on the current operating environment state and a slack allocation policy, wherein the slack allocation policy defines criteria for allocating the environmentally regulated slack based on the current operating environment state.

Example 12 includes the method of example 11, further comprising: executing a budgeted TPE at the start of a current time period; and determining when the budgeted TPE has completed execution with available time left in the current time period; wherein allocating available environmentally regulated slack comprises allocating environmentally regulated slack within the current time period.

Example 13 includes the method of any of examples 11-12, wherein calculating a current operating environment state further comprises inputting one or more operational environment parameters associated with at least one processing core of the time partitioned processing system from an operational environment sensor.

Example 14 includes the method of example 13, wherein the at least one operational environment sensor is internal to the time partitioned processing system.

Example 15 includes the method of any of examples 11-14, wherein calculating a current operating environment state further comprises: measuring one or more operational environment parameters associated with at least one processing core of the time partitioned processing system, the one or more operational environment parameters comprising at least one of: a temperature measurement; a measurement of power or current drawn by the at least one processing core; a measurement of voltage level; a measurement of current, power or voltage fluctuation; or a measurement of an output of a power supply to the at least one processing core.

Example 16 includes the method of any of examples 11-15, further comprising: when the operational environment state indicates that an operational environment threshold is exceeded, curtailing allocation of environmentally regulated slack to slack consuming TPEs based on a priority associated with the at least one slack consuming TPE.

Example 17 includes the method of any of examples 11-16, further comprising: when the operational environment state indicates that an operational environment threshold is exceeded, curtailing allocation of environmentally regulated slack to slack consuming TPEs by reducing a percent of environmentally regulated slack which is eligible for allocation.

Example 18 includes the method of any of examples 11-17, further comprising: placing at least one processing core of the time partitioned processing system into a sleep state during periods of environmentally regulated slack not allocated to at least one slack consuming TPE.

Example 19 includes the method of example 18, wherein placing the at least one processing core into a sleep state further comprises: invoking a board support package coupled to the at least one processing core, wherein the board support package places the at least one processing core into the sleep state until either an interrupt or a periodic partition scheduling point occurs.

In various alternative embodiments, system elements, method steps, or examples described throughout this disclosure (such as the Time Partitioned Processing System, Scheduler, Environment Monitor, Operating Environment Sensor, or sub-parts thereof, for example) may be implemented using one or more computer systems, field programmable gate arrays (FPGAs), a system on a chip (SOC), graphic processing units (GPUs), application-specific integrated circuit (ASIC) or similar devices comprising a processor coupled to a memory (such as shown in FIG. 1, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A time partitioned processing system, the system comprising:
    at least one processing core;
    a memory coupled to the at least one processing core;
    a real-time operating system, the real-time operating system including a scheduler configured to partition processing time for the at least one processing core into a plurality of time periods, wherein the scheduler further budgets a pre-determined duration of processing time for executing a first budgeted time partitioned entity (TPE) by allocating at least a first allocation of time to the first budgeted TPE;
    wherein the scheduler utilizes at least a portion of processing time within the plurality of time periods not used to execute the first budgeted TPE or any other budgeted TPE as environmentally regulated slack;
    wherein the scheduler allocates at least a portion of environmentally regulated slack to one or more slack consuming TPEs based on a measurement of one or more operational environment parameters associated with the at least one processing core.

2. The system of claim 1, wherein any balance of time in a first time period remaining after execution of the first budgeted TPE is complete is utilized by the scheduler as environmentally regulated slack.

3. The system of claim 1, wherein at least one time period of the plurality of time periods is not utilized to schedule budgeted TPEs and is utilized as environmentally regulated slack.

4. The system of claim 1, further comprising:
    an environment monitor in communication with the scheduler;
    at least one operational environment sensor coupled to the environment monitor, wherein the at least one operational environment sensor measures at least one of the one or more operational environment parameters associated with the at least one processing core and the environment monitor determines an operational environment state based on the one or more operational environment parameters; and
    a slack allocation policy accessible to the scheduler, the slack allocation policy defining rules for the allocating environmentally regulated slack;
    wherein the scheduler allocates environmentally regulated slack to the one or more slack consuming TPEs based on the operational environment state determined by the environment monitor and the slack allocation policy.

5. The system of claim 4, wherein when the operational environment state indicates that an operational environment threshold is exceeded, the scheduler designates the portion of the environmentally regulated slack as restricted slack time during which allocation of said portion of the environmentally regulated slack to slack consuming TPEs is at least partially curtailed.

6. The system of claim 4, wherein when the scheduler curtails allocation of environmentally regulated slack to slack consuming TPEs based on priority.

7. The system of claim 4, wherein when the scheduler curtails allocation of environmentally regulated slack to slack consuming TPEs by reducing the percent of environmentally regulated slack which is eligible for allocation.

8. The system of claim 4, wherein based on the operational environment state determined by the environment monitor and the slack allocation policy, the at least one processing core is placed into a sleep state during periods of environmentally regulated slack not allocated to at least one slack consuming TPE.

9. The system of claim 8, further comprising a board support package coupled to the at least one processing core, wherein the board support package places the at least one processing core into the sleep state until either an interrupt or a periodic partition scheduling point occurs.

10. The system of claim 1, wherein the one or more operational environment parameters associated with the at least one processing core include at least one of:
 a temperature measurement;
 a measurement of power or current drawn by the at least one processing core;
 a measurement of voltage level;
 a measurement of current, power or voltage fluctuation; or
 a measurement of an output of a power supply to the at least one processing core.

11. A method for environmental regulation of slack allocation for a time partitioned processing system, the method comprising:
 determining when at least one slack consuming time partitioned entity (TPE) is requesting an allocation of slack time to execute on a time partitioned processing system;
 calculating a current operating environment state based on data from at least one operational environment sensor; and
 allocating available environmentally regulated slack in a first time period to the at least one slack consuming TPE to execute on the time partitioned processing system based on the current operating environment state and a slack allocation policy, wherein the slack allocation policy defines criteria for allocating the environmentally regulated slack based on the current operating environment state.

12. The method of claim 11, further comprising:
 executing a budgeted TPE at the start of a current time period; and
 determining when the budgeted TPE has completed execution with available time left in the current time period;
 wherein allocating available environmentally regulated slack comprises allocating environmentally regulated slack within the current time period.

13. The method of claim 11, wherein calculating a current operating environment state further comprises inputting one or more operational environment parameters associated with at least one processing core of the time partitioned processing system from an operational environment sensor.

14. The method of claim 13, wherein the at least one operational environment sensor is internal to the time partitioned processing system.

15. The method of claim 11, wherein calculating a current operating environment state further comprises:
 measuring one or more operational environment parameters associated with at least one processing core of the time partitioned processing system, the one or more operational environment parameters comprising at least one of:
 a temperature measurement;
 a measurement of power or current drawn by the at least one processing core;
 a measurement of voltage level;
 a measurement of current, power or voltage fluctuation; or
 a measurement of an output of a power supply to the at least one processing core.

16. The method of claim 11, further comprising:
 when the operational environment state indicates that an operational environment threshold is exceeded, curtailing allocation of environmentally regulated slack to slack consuming TPEs based on a priority associated with the at least one slack consuming TPE.

17. The method of claim 11, further comprising:
 when the operational environment state indicates that an operational environment threshold is exceeded, curtailing allocation of environmentally regulated slack to slack consuming TPEs by reducing a percent of environmentally regulated slack which is eligible for allocation.

18. The method of claim 11, further comprising:
 placing at least one processing core of the time partitioned processing system into a sleep state during periods of environmentally regulated slack not allocated to at least one slack consuming TPE.

19. The method of claim 18, wherein placing the at least one processing core into a sleep state further comprises:
 invoking a board support package coupled to the at least one processing core, wherein the board support package places the at least one processing core into the sleep state until either an interrupt or a periodic partition scheduling point occurs.

* * * * *